United States Patent [19]

Zur et al.

[11] Patent Number: 5,383,341
[45] Date of Patent: Jan. 24, 1995

[54] REFRIGERATION, HEATING AND AIR CONDITIONING SYSTEM FOR VEHICLES

[75] Inventors: Avigdor Zur; Itzhak Shechtman, both of Haifa, Israel

[73] Assignee: Uri Rapoport, Elmhurst, Ill.

[21] Appl. No.: 74,238

[22] Filed: Jun. 9, 1993

Related U.S. Application Data

[63] Continuation-in-part of Ser. No. 918,846, Jul. 21, 1992, abandoned.

[30] Foreign Application Priority Data

Jul. 23, 1991 [IL] Israel .................................. 098938

[51] Int. Cl.$^6$ .......................... F25B 15/00; B60H 3/00
[52] U.S. Cl. .................................. 62/476; 62/239; 62/238.3; 62/112
[58] Field of Search ............ 62/476, 239, 243, 323.1, 62/323.2, 101, 238.3, 112

[56] References Cited

U.S. PATENT DOCUMENTS

| | | | |
|---|---|---|---|
| 2,783,622 | 3/1957 | Bourassa | 62/238.3 |
| 2,839,274 | 6/1958 | Polin | 62/238.3 |
| 3,661,200 | 5/1972 | McNamara | 165/42 |
| 4,307,575 | 12/1981 | Frosch et al. | 62/148 |
| 4,380,909 | 4/1983 | Sung | 62/79 |
| 4,437,321 | 3/1984 | Asai | 62/324.2 |
| 4,482,004 | 11/1984 | Grover | 165/1 |
| 4,485,865 | 12/1984 | McCurley | 165/76 |
| 4,509,336 | 4/1985 | Ouchi et al. | 62/112 |
| 4,715,192 | 12/1987 | Katz | 62/323.1 |
| 4,719,767 | 1/1988 | Reid et al. | 62/476 |
| 4,732,008 | 3/1988 | DeVault | 62/79 |
| 4,773,473 | 9/1988 | Konitzer | 165/41 |
| 5,082,049 | 1/1992 | Nekola | 165/32 |
| 5,083,607 | 1/1992 | Lebrun et al. | 165/104.12 |

OTHER PUBLICATIONS

Thermodynamic and Physical Property Data Equations for Ammonia–Lithium Nitrate and Ammonia–Sodium Thiocynate Solutions. 32 *Solar Energy*, 231–36 (1984).
Investigation of Absorption Refrigeration Machine Operating on Solution of Methanol and Lithium-bromide. 43 *Reito*, 784–97 (1968).
Thermal and Physical Properties of the Methanol-Lithium Bromide–Zinc Chloride System. 14 *Int. J. Refrig.*, 78–85 (1991).

*Primary Examiner*—Henry A. Bennett
*Assistant Examiner*—William C. Doerrler
*Attorney, Agent, or Firm*—Jones, Day, Reavis & Pogue

[57] ABSTRACT

An absorption system for heating, refrigerating and conditioning air for use in vehicles is disclosed. The refrigerant-absorbent mixture, presenting a coefficient of performance of around 0.9, is heated by the waste heat of exhaust gases from the vehicle which has a fuel-driven internal combustion engine. The absorption system is based on the principle of evaporation at relatively low pressure and temperature followed by absorption of refrigerant vapor by the absorbent and then evaporation of the refrigerant from the absorbent when heated by an external heat source.

12 Claims, 3 Drawing Sheets

REFRIGERATION, HEATING AND AIR CONDITIONING SYSTEM FOR VEHICLES

This is a continuation-in-part of copending application(s) Ser. No. 07/918,846 filed on Jul. 21, 1992 now abandoned, which bases priority on Israeli patent application no. 098938 filed Jul. 23, 1991.

FIELD OF THE INVENTION

The present invention relates to a refrigeration, heating and air conditioning system for use in vehicles and, in particular, to an absorption-refrigeration system based on the principle of evaporation of a refrigerant at relatively low pressure and temperature followed by absorption of the refrigerant vapor by the absorbent at relatively low pressure and then evaporation of the refrigerant from the absorbent when heated by an external heat source.

The present invention relates moreover to an absorption-refrigeration system in which the refrigerant-absorbent mixture is heated by the waste heat of exhaust gases from the vehicle which has a fuel-driven internal combustion engine.

BACKGROUND OF THE INVENTION

The general use of air conditioning and refrigeration systems in vehicles in particular is well known. Descriptions of these systems can be found in many engineering textbooks and monographs such as W. F. Stoecker, *Refrigeration and Air Conditioning* McGraw-Hill, 1958.

These systems can be divided into two categories according to their principle of operation: (1) systems based on the compression of refrigerant vapor, and (2) systems based on the absorption of refrigerant vapor.

The most common refrigeration system is the compression system. The main components of a compression system are an evaporator, a compressor, a condenser and an expansion valve. In the operation of such a compression system, refrigeration is produced by the repeated process of compression, condensation, expansion and evaporation of a refrigerant, which is a liquid with a relatively high vapor pressure.

Two principal conditions must be satisfied for a compression system to operate: (1) energy must be supplied to operate the compressor; and (2) separate cooling must be provided for condenser operation. Because of these conditions, several disadvantages are inherent in the operation of a compression refrigeration system in vehicles.

Part of the engine power of the vehicle usually serves as the energy source for the compressor, thereby reducing the availability of power for locomotion and increasing fuel consumption. This drawback restricts application of the compression system mostly to relatively high-powered cars and industrial vehicles such as lorries. Moreover, the refrigeration effect is reduced when operating at low revolutions, and no refrigeration is generated at all when the engine stops.

The condenser is cooled by engine cooling water or by an air fan. Use of engine cooling water reduces engine efficiency and overloads the engine cooling system. Moreover, the refrigerants used in compression systems are usually freons which are environmentally harmful.

Despite these inherent disadvantages, compression refrigeration systems are rather common both in general use and in vehicles in particular, because their coefficient of performance ("C.O.P.") is high and construction is relatively simple. The C.O.P. is the ratio between the "cold" produced and the energy consumed.

The second type of refrigeration system is an absorption-separation ("absorption") system. Absorption systems have been known for a long time, their first use probably dates back to the American Civil War.

The operation principle of the absorption system is similar to that of the compression system, and its main components also include an evaporator and a condenser. However, instead of a compressor, which is a mechanical means for increasing the pressure difference between the evaporator and the condenser, the absorption system utilizes a generator filled with a mixture of at least two intermiscible substances (a refrigerant and an absorbent) and an absorber, in which the absorption of the refrigerant by the absorbent takes place. The refrigerant and the absorbent should have sufficiently different vapor pressures, so that when the generator is heated, the more volatile refrigerant evaporates to be condensed in the condenser.

The absorption system usually includes a pump to deliver the liquid from the absorber back to the generator. The vapor from the generator passes to the condenser, where it condenses into a liquid and then proceeds via a pressure reducing valve into the evaporator where it again turns into vapor with the accompanying cooling effect due to the absorption of its latent heat of vaporization.

The absorption system also includes fanned air or cooling liquid to cool the absorber and condenser. The main advantage of this system is that only a small amount of mechanical work is required for operation. Instead of expending a large quantity of mechanical energy to operate the compressor, only a negligible amount is needed to operate the pump and cooling means.

On the other hand, because the energy received by the system is in the form of heat supplied to the generator, the C.O.P. is much lower in absorption systems than in compression systems. Consequently, these systems are used in applications where power supply is not sufficient, but heat is available.

Another obstacle to using absorption systems is that the refrigerant-absorbent pair must possess a certain combination of properties: volatility, solubility, viscosity, latent heat of vaporization, etc. The common choices for the refrigerant-absorbent pair are water-ammonia and water-lithium bromide. However, these refrigerant-absorbent pairs operate with low C.O.P.'s when used in an absorption system.

Nevertheless, several have attempted to use absorption systems for refrigerating and air conditioning vehicles because of the very attractive possibility of utilizing the waste heat of exhaust gases as an external heat source for the generator. The systems described in U.S. Pat. Nos. 3,661,200 and 4,924,676, and British Application Nos. 1,368,911, and European Patent No. 350,764 are examples of these attempts.

One main disadvantage of these patented systems are associated with the problem of optimizing the conditions for transferring heat from the exhaust gases to the generator. For example, the absorption system described in U.S. Pat. No. 3,661,200 has a generator installed in a casing which extends along and over the exhaust conduit of the engine. U.S. Pat. No. 2,783,622 describes a helical generator which coils around the exhaust conduit.

The waste gases in these patented absorption systems usually enter the exhaust pipe at a temperature of between 600 and 800 degrees Celsius and a pressure of a few inches of Mercury; the gases move along the exhaust pipe at velocities of 60–100 meters/second. Effective extraction of heat from the exhaust pipe and its transfer under these conditions to a generator designed according to the above-mentioned patents requires a very large heat transfer area, which requires an excessively long generator and exhaust conduit. Such a configuration causes pumping and pressure drops.

For example, the invention of U.S. Pat. No. 2,783,622 ("'622 Patent") is not operative on a scale small enough to fit in a motor vehicle. Calculations derived from the disclosure of the system disclosed in the '622 Patent indicate that for a functional amount of heat transfer to occur, the exhaust bypass and the generator must each be 10 to 11 feet long. This is longer than many motor vehicles.

Furthermore, assuming that both a generator and exhaust bypass with sufficient area of heat transfer could fit under a motor vehicle, the diameter of the vapor lines in the absorption system of the '622 Patent would have to be more than 1 foot to provide for sufficient volumetric water vapor flow through the system to generate sufficient cooling.

The U.S. Pat. No. 3,661,200 ("'200 Patent") mentions the problem of ineffective heat transfer, but does not provide a specific solution. Additionally, the absorption system described in the '200 Patent operates under high pressure. Hence, that absorption system must have thick walls to withstand the relatively high pressure.

According to the '200 Patent, the interior wall of the generator serves as the exterior wall of the exhaust conduit along the area of heat transfer. ('200 Patent, col. 2, line 67 to col. 3, line 26). Hence, both the generator and the exhaust conduit must have thick walls. The system of the '200 Patent is similar to the system of the '622 Patent in that both systems must have an excessive heat transfer area to effectively operate. Hence, the configuration of the '200 Patent which requires both an exhaust conduit and a generator with long, thick bulky walls would be difficult to install in a motor vehicle.

Some patented absorption systems relate to an alternative configuration where the generator is placed inside the exhaust pipe to ensure direct contact with the hot waste gases. The presence of a generator in the exhaust pipe causes back pressure on the engine outlet ports which reduces engine thermodynamic efficiency.

As an inevitable consequence of all the stated problems, the known refrigeration and air conditioning absorption systems for vehicles become complex, bulky and inefficient. A practical, efficient and economical absorption system based on the utilization of waste heat from exhaust gases that does not adversely affect the engine performance is still unavailable.

SUMMARY OF THE INVENTION

The object of the present invention is to provide an absorption refrigeration and air conditioning system for use in a vehicle in which the above mentioned drawbacks are reduced or eliminated while the inherent advantages of the absorption principle still remain.

In particular, the first object of the present invention is to provide a simple absorption system for use in vehicles which efficiently extracts the heat of waste gases passing through the exhaust conduit without necessitating an excessively large exhaust conduit and generator, without increasing the wall thickness of the exhaust pipe and causing only negligible back pressure to the engine.

The second object of the present invention is to provide an absorption system in which efficient heat transfer from the exhaust gases to the generator system ensures achieving and maintaining a maximum cooling effect independently of the rotational speed of the engine.

The third object of the present invention is to utilize refrigerant-absorbent solutions which operate within an absorption system with a C.O.P. of around 0.9, so that the system can be scaled down sufficiently to function under a motor vehicle.

The fourth object of the present invention is to provide an efficient absorption system which utilizes the heat of the engine waste gases with a minimum pressure drop and temperature gradient in the exhaust gases to improve engine efficiency.

The fifth object of the present invention is to provide an improved and compact absorption system, which includes a heat exchanger, that can be installed in the motor compartment of any car without reducing engine performance and without increasing fuel consumption.

The sixth object of the present invention is to provide an efficient absorption system, in which a small fan cools the absorber and the condenser but demands little power from the engine.

The seventh object of the present invention is to provide an absorption system that is capable of quickly generating heat with negligible lag time after the system begins operation.

These objects can be achieved by the present invention. The absorption system of the present invention has a generator heated by the heat transferred by an intermediate means from waste gases passing through the exhaust conduit. The intermediate means has one or a plurality of heat pipes which transfer heat from an internal receiving portion of the exhaust conduit to the refrigerant-absorption mixture in the generator. The heat is adiabatically transferred by a medium inside the heat pipes.

The system is filled with a mixture of at least two intermiscible components having different volatilities. The vapor of the more volatile component evolves to serve as a refrigerant when the components are both heated in the generator. The less volatile component serves as an absorbent for the vapor. The components have properties which allow the absorption system to operate with a C.O.P. of about 0.9.

The system includes an absorber connected to the generator in which the refrigerant after passing through a condenser and an evaporator is absorbed by the absorbent coming from the bottom of the generator.

In the condenser, the refrigerant vapor coming from the generator liquefies and then expands into an evaporator connected to said condenser via an expansion valve. The expansion of the condensed refrigerant into vapor provides the cooling effect necessary to cool the air subjected to the evaporator.

The system also includes a pump for transferring the refrigerant-absorbent mixture from the absorber back to the generator. A heat exchanger for transferring heat from the absorbent exiting the generator to the refrigerant-absorbent mixture exiting the absorber.

The mixing of the refrigerant and the solvent in the absorber gives off a heat of absorption. The condensation of the refrigerant vapor in the condenser gives off a heat of condensation. Both the condenser and the absorber are cooled by a fan which pushes air over them. The air that is heated from cooling the condenser and the absorber can be used for heating purposes.

In fact, the absorption system generates heat more advantageously than conventional motor vehicle heating systems because the former begins generating heat as soon as the system begins operation, without lag time. In conventional motor vehicle heating systems, heat sufficient to warm the passenger compartment is not generated until the engine gets sufficiently hot. Whereas, with the absorption system of the present invention, sufficient heat from the heat of absorption is generated as soon as the refrigerant is absorbed by the absorbent.

In accordance with the invention, a fan supplies air to the evaporator, where the air is subjected to the cooling effect. The fan then supplies the resulting cooled air to the passenger compartment. The cooled and conditioned air may be warmed first by mixing it with the air heated by the absorber and the condenser before it is distributed into the passenger compartment. In cold times, it may be desirable to supply the air heated by the absorber and the condenser to the passenger compartment after only minimal mixing with the air cooled by the evaporator.

The system also utilizes a means for controlling the refrigerant vapor pressure inside the evaporator, the level of the refrigerant-absorbent mixture inside the generator and the amount of waste gases passing through the exhaust conduit.

The system of the present invention is the first absorption system to be successfully adapted to vehicles. The system is capable of being reduced to a much smaller scale because the mechanical and chemical components of the invention operate much more efficiently than the components in the prior art.

The present invention utilizes heat pipes to extract heat from waste gases in the exhaust conduit and adiabatically transfer the heat to the mixture in the generator. In a preferred embodiment of the invention, the exhaust conduit is provided with an internal receiving portion for connection to the heat pipes. The pipes are oriented in such a manner that waste gases passing through the exhaust conduit flow over the evaporator section of each pipe inserted into said receiving portion. The condenser section of each pipe is inserted into the generator and contacts the refrigerant-absorbent mixture therein.

The heat pipes provide a maximum heat flux density and a minimum temperature gradient during heat transfer. No one has before this invention used heat pipes to adiabatically transfer heat from the exhaust gases to the generator of an absorption system on a compact scale commensurate with a motor vehicle.

The system also uses refrigerant-solvent solutions which function much more efficiently in an absorption system than those used by systems disclosed in the prior art. The lithium bromide-water solution used by the system disclosed in U.S. Pat. No. 2,783,622 provides a C.O.P. of about 0.6 in a large system, if water-cooled, and much lower if air-cooled. Whereas, the unconventional solutions disclosed in this invention yield a C.O.P. of around 0.9.

The present invention in its various aspects has only been summarized briefly. For a better understanding of the present invention and its objects and advantages, reference should be made to the following description of its preferred embodiment taken in conjunction with the accompanying drawings.

DESCRIPTION OF THE PREFERRED EMBODIMENT

Figure 1:
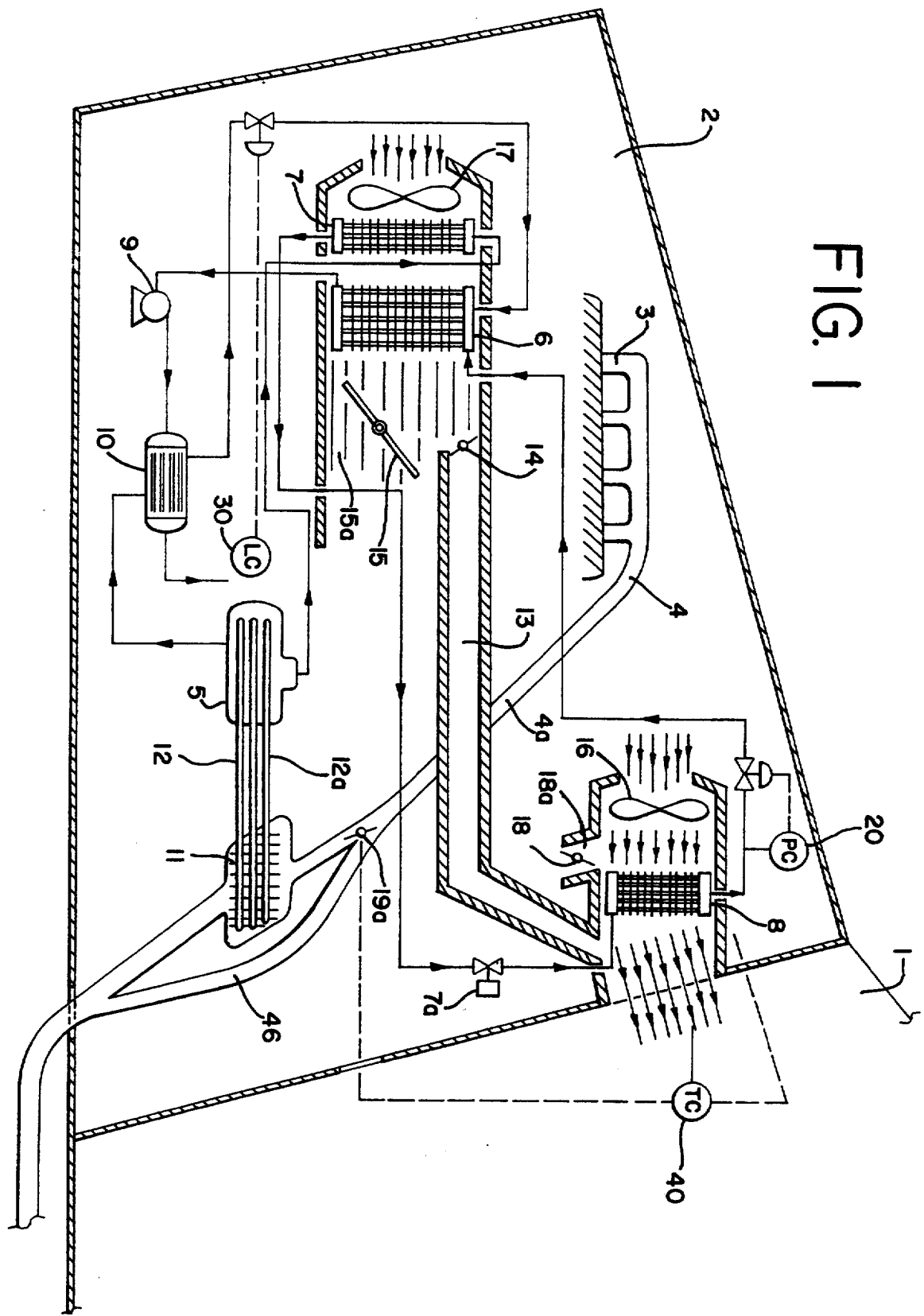
FIG. 1 is a schematic view of the system according to the present invention including its main components installed in an engine compartment of a motor vehicle.

FIG. 1 presents an absorption system for refrigerating, heating and air conditioning a passenger compartment 1 of a vehicle provided with a fuel-driven internal combustion engine. The system is installed in a vehicle engine compartment 2 and utilizes the heat of waste gases entering an exhaust conduit 4 from engine outlet ports 3.

The main components of the system include a generator 5, an absorber 6, a condenser 7, an evaporator 8, an expansion valve 7a, a pump 9 and a heat exchanger 10.

The generator 5 is filled with a mixture of at least two intermiscible components having different volatilities. In many systems, a two-liquid solution is utilized. The present invention utilizes a liquid-solid solution. Typically, the component with higher volatility serves as a refrigerant, and a concentrated solution of the component with lower volatility serves as an absorbent.

In accordance with the present invention, a concentrated salt solution serves as the absorbent and the solvent serves as the refrigerant. Optimally, it is desired for the salt/solvent system to provide a high C.O.P. The salt/solvent solutions of the present invention provide a C.O.P. of between about 0.8 and 1.0. Suitable salts for this purpose include $NaSCN$, $ZnCl_2$, $LiBr$, $LiNO_3$ and mixtures thereof. Suitable solvents have been found to include methanol, ethanol, ammonia, acetone, ethyl acetate, methyl acetate, methyl acetate-water azeotrope, tetrahydrofuran and mixtures thereof.

A solution of $NaSCN$ and $NH_3$ is a preferred mixture for use in accordance with the present invention. It has been found that such a solution provides a C.O.P. of about 0.9 when it operates under about 26 atmospheres of absolute pressure. A solution of methanol with both $ZnCl_2$ and $LiBr$ is most preferred for use in the present invention. The latter solution also yields a C.O.P. of close to 0.9 when operating in accordance with the present invention under about 0.5 atmospheres of absolute pressure.

The generator 5 is heated by the heat extracted from waste gases passing through the main branch 4a and entering the receiving portion 11 of the exhaust conduit 4. This heat is transferred to the generator 5 via intermediate means 12 which connects the receiving portion 11 with the generator 5. A more elaborate description of the intermediate means 12 will be presented subsequently.

When the generator 5 is heated, the pressure and temperature therein increase, and the vapor of the more volatile component concentrates at the top of the generator 5. The vapor then passes to the condenser 7 where it condenses because the condenser 7 is air-cooled by fan 17. The air used to cool the condenser is heated by the heat of condensation given off from the condensing refrigerant. The heated air can be used for heating purposes.

The pressure of the condensed refrigerant coming out at a bottom of the condenser is reduced when it flows through the expansion valve 7a, where part of the liquid evaporates. Evaporation of the rest of the refrigerant takes place in the evaporator 8 at reduced pressure. The evaporation of the refrigerant is accompanied by cooling due to extraction of the latent heat of vaporization of the refrigerant from the surroundings. Air subject to the evaporator 8 is used for cooling.

The vapor produced in the evaporator 8 flows back to the absorber 6 where it is absorbed by a stream of absorbent exiting a bottom of the generator 5. The absorption of the refrigerant by the absorbent gives off a heat of absorption. Hence, the absorber is air-cooled by fan 17. This heated air can also be used for heating purposes.

The hot solution of the absorbent enriched by the refrigerant component is pumped back to the generator 5 by means of the pump 9 via the heat exchanger 10. The pump 9 provides the internal driving force for transporting the refrigerant and absorbent throughout the whole system.

The hot concentrated absorbent solution from the bottom of the generator 5 passes through the heat exchanger 10 and transfers heat to the stream of refrigerant-enriched absorbent returning to the generator 5 from the absorber 6, thereby heating the refrigerant-absorbent mixture exiting the absorber 6 and cooling the absorbent exiting the generator.

The fan 16 supplies ambient air to the evaporator 8, which cools the air before it enters the passenger compartment. The amount of air to be cooled and supplied as a cooling media to the passenger compartment can be adjusted with a butterfly valve 18 installed in an outlet 18a located between the fan 16 and the evaporator 8.

The fan 17 supplies ambient air for cooling the absorber 6 and condenser 7. This air is thus heated by the heat released upon absorption and condensation of the refrigerant. Separate fans may be provided for cooling the absorber 6 and the condenser 7.

The heated air is pushed by the fan 17 via a duct 13 to the passenger compartment for heating the compartment. The heated air can also be cooled by preliminarily mixing it with the cold air which was subjected to the evaporator 8 before pushing it into the passenger compartment. The amount of hot air passing through the duct 13 can be adjusted with two butterfly valves 14 and 15 installed in duct 13 and with outlet 15a opened to the atmosphere.

For operation of both of the fans 16 and 17 and the pump 9 only a small amount of power is needed. The power can be supplied by the vehicle battery.

Figure 4:
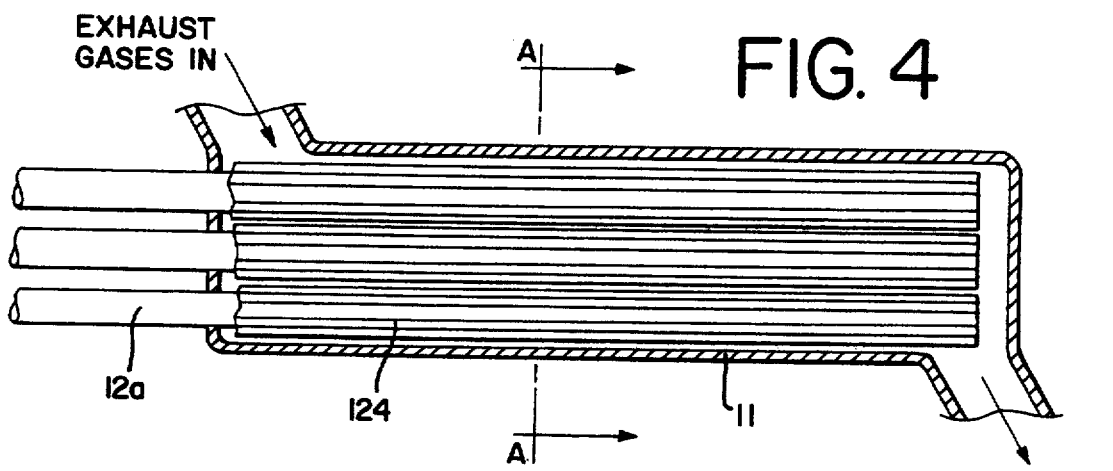
FIG. 4 shows a cut-away elevational view of a plurality of heat pipes inserted into the internal receiving portion of the exhaust conduit.

The intermediate means 12 which serves to extract heat from the waste gases and transfer it to the generator will be explained with reference to FIGS. 4 and 5. The intermediate means 12 comprises one or a plurality of small devices 12a known in the art as heat pipes.

These heat pipes 12a link the generator 5 and the interior receiving portion 11 of the exhaust conduit 4.

Figure 5:
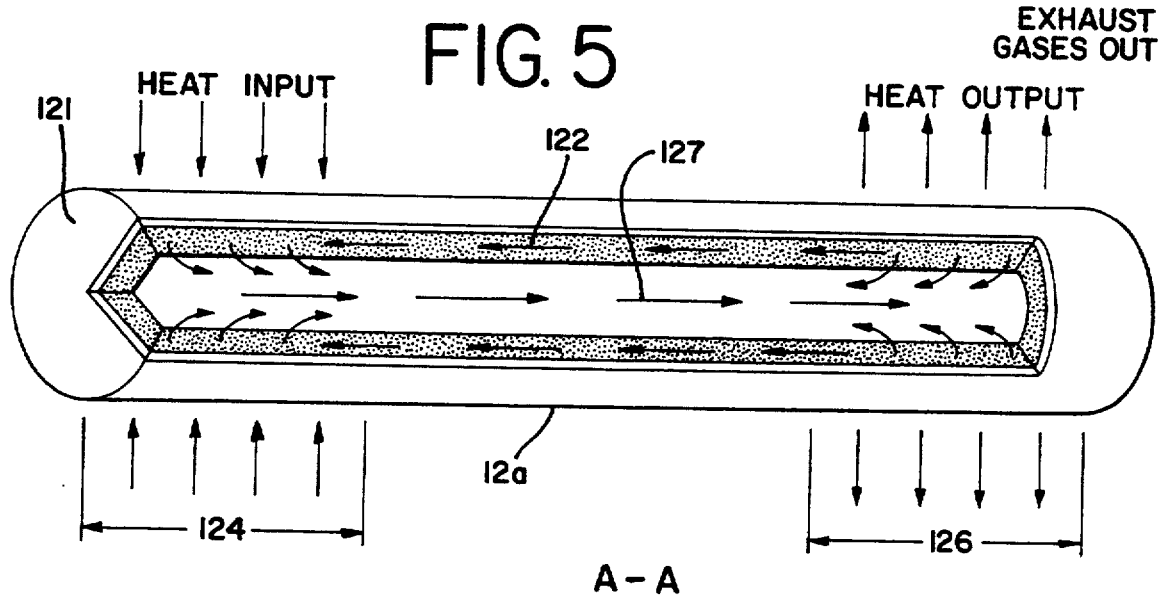
FIG. 5 shows an exploded view of a heat pipe with an evaporator and a condenser section.

The heat pipe 12 construction as shown in FIG. 5 consists of a tubular container 121 containing a hollow wick 122 made of a fibrous or porous material and filled with a volatile medium. The heat input at the evaporator section 124 of the heat pipe 12a causes the liquid medium in the wick to vaporize. The vapor moves inside the hollow section 127 of the wick towards condenser section 126.

The vapor condenses back to a liquid in the condenser section 126, thereby distributing the accompanying heat output into the surroundings to provide a heat effect. The liquid then after condensation moves back to the evaporator section 124 due to the capillarity structure of the wick 122.

The intermediate means 12 has one or a plurality of heat pipes 12a oriented in such a manner that the evaporator sections 124 of each pipe are inserted into the interior receiving portion 11 of the exhaust conduit 4. Condenser sections 126 are inserted into the generator 5. Hot waste gases passing through the exhaust conduit 4 flow over and heat the evaporator sections 124. The condenser sections 126 are in close contact with the refrigerant-absorbent mixture in the generator 5 for heating the mixture.

The above design of the intermediate means ensures extraction of heat from the waste gases and adiabatic heat transfer to the vehicle absorption system to promote the cooling effect with a minimum temperature gradient along the intermediate means.

The amount of the waste gases entering the receiving portion and flowing over the evaporator section of each heat pipe 12a can be adjusted with the butterfly valve 19a placed in the main branch adjacent to the receiving section.

The present invention provides additional advantages that are achieved by the absorption system.

Figure 2:
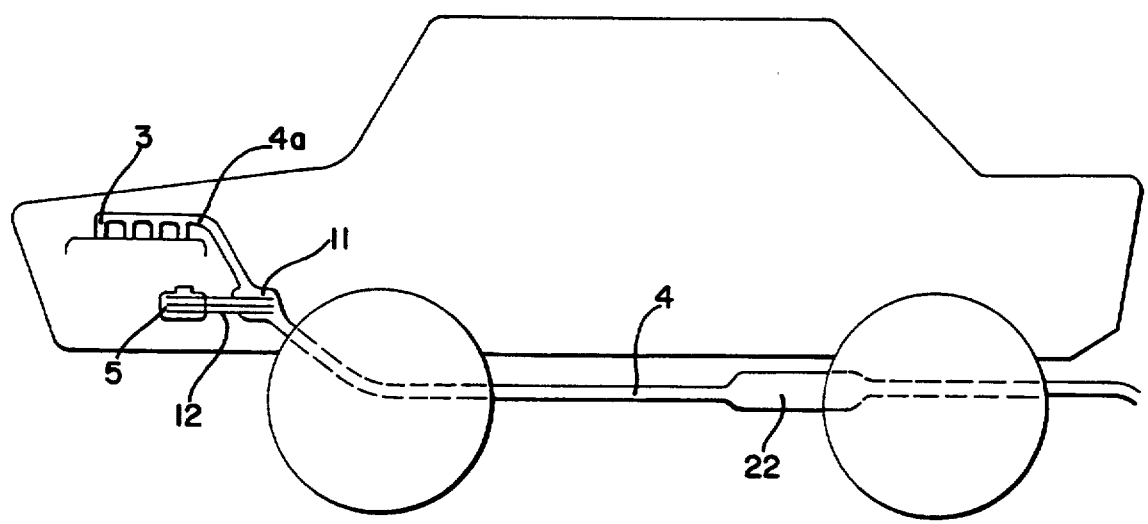
FIG. 2 shows an intermediate means linking a generator with an internal receiving portion of an exhaust conduit when the receiving portion is located in a main branch of the conduit.
Figure 3:
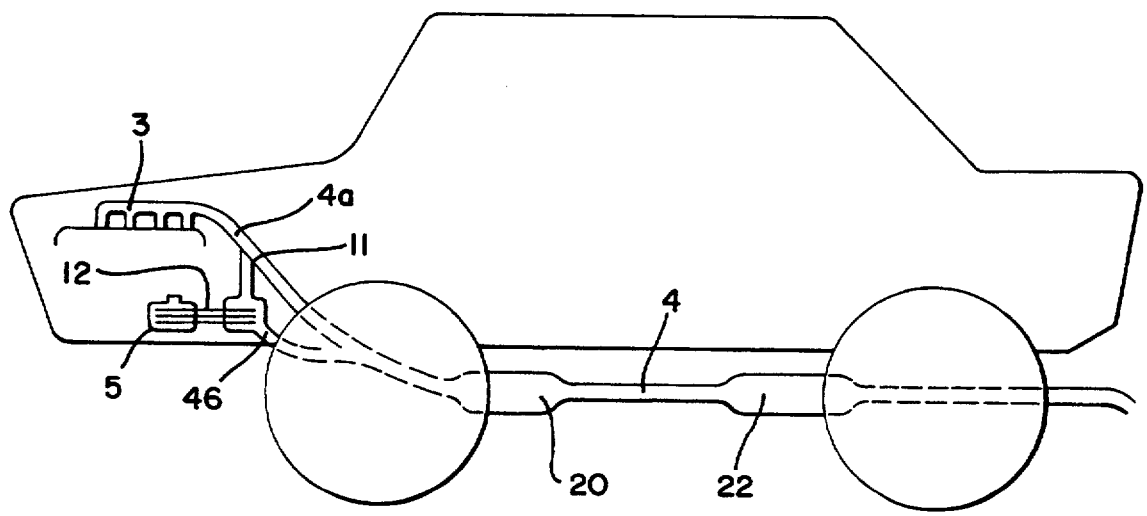
FIG. 3 shows the intermediate means linking the generator with the internal receiving portion of the exhaust conduit when said portion is located in a bypass of the conduit.

FIGS. 1 and 2 show the location of the interior receiving portion 11 in the main branch 4a of the conduit, while FIG. 3 shows how the receiving portion 11 can be located in the bypass 4b of the exhaust conduit. The embodiment ensures extraction of heat from the waste gases causing only negligible back pressure on the engine outlet port, which if higher could reduce engine efficiency.

Figure 6:
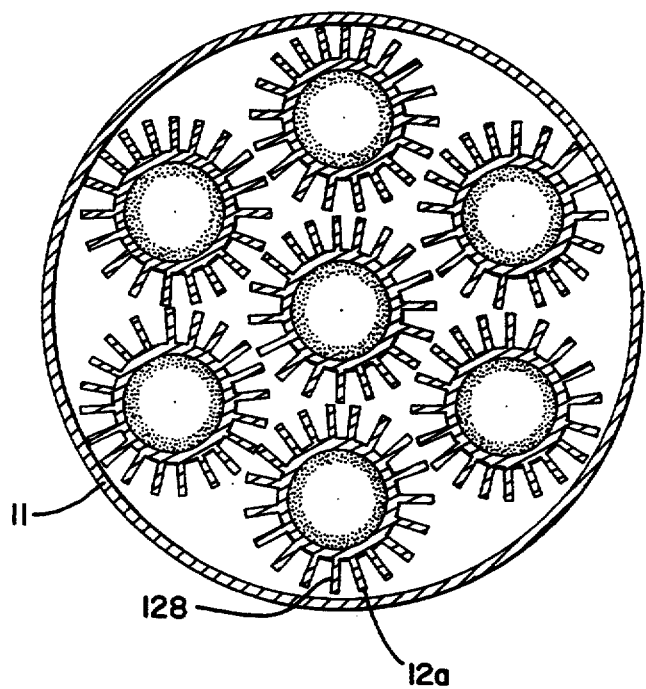
FIG. 6 shows a cross section of FIG. 4 along A—A.

Another embodiment of the present invention is presented in FIG. 6. This figure shows that the heat pipes 12a of the intermediate means 12 are provided with extending fins 128 protruding from their outside surfaces.

These fins 128 extending along evaporator sections 124 of the heat pipes 12a inside the receiving portion 11 of the exhaust conduit increase the heat transfer area and serve as a labyrinth for gases moving through the conduit 4. The fins 128 enhance heat transfer of the heat pipe 12a and provide a silencing effect in addition to the dedicated silencers 20, 22. These effects can be achieved also if only part of the heat pipes is provided with these fins. The fins 128 may extend from the heat 12a pipe either longitudinally or latitudinally.

Different control means, some of which are shown in FIG. 1, contribute to the reliable functioning of the system according to the present invention. The pressostat 20 governs the pressure and thus the temperature in the evaporator 8. The level device 30 controls the level of refrigerant-absorbent mixture in the generator 5 and regulates the flow of absorbent from the generator 5 to the absorber 6. The thermostat 40 controls the position of the butterfly valve 19a and the amount of heat transferred from the waste gases to the generator 5 via the intermediate means 12.

It is not particularly shown in the drawings, but one of ordinary in the art will understand that the amount of cooled air passing the evaporator 8 and entering the passenger compartment depends on the rotational speed of the fan 16. The fan 16 may be controlled by the thermostat 40. The thermostat 40 may also control one or all of valves 7a, 14, 15, 18, 19a and 20 to provide air to the passenger compartment at the desired temperature.

The invention has been described in detail with particular reference to preferred embodiments thereof. However, variations and modifications can be effected within the spirit and scope of the invention as described hereinabove and as set forth in the claims.

We claim:

1. A system structured and dimensioned for incorporation into a motorized vehicle for air conditioning a passenger compartment of said vehicle comprising:

(a) a generator heated by heat of waste gases passing through an exhaust conduit, said generator contains a mixture of two intermiscible components consisting essentially of a first more volatile component selected from the group consisting of methyl alcohol, ethyl alcohol, ammonia, acetone, ethyl acetate, methyl acetate, methyl acetate-water azeotrope, tetrahydrofuran and mixtures thereof, and a second less volatile component selected from the group consisting of NaSCN, $ZnCl_2$, LiBr, $LiNO_3$ and mixtures thereof, said more volatile first component producing vapor when heated in said generator, said vapor serving as a refrigerant, and a concentrated solution of said less volatile second component in said more volatile first component serving as an absorbent for said vapor;

(b) means for transporting said refrigerant vapor from said generator to a condenser, wherein said refrigerant vapor condenses to provide a heating effect;

(c) means for transporting said condensed refrigerant from said condenser via a pressure reducing means to an evaporator, wherein said refrigerant expands to a vapor to provide a cooling effect;

(d) means for transporting said refrigerant vapor from said evaporator to an absorber, and means for transporting said absorbent from said generator to said absorber, wherein said absorbent absorbs said refrigerant vapor to produce an absorbent-refrigerant mixture and provide a heating effect;

(e) means for transporting said absorbent-refrigerant mixture from said absorber back to said generator;

(f) means for subjecting air to the heating effect provided by said absorber and said condenser to cool said absorber and said condenser and to obtain heated air;

(g) means for subjecting air to the cooling effect provided by said evaporator to obtain cooled air;

(h) means for mixing proportions of said cooled air and said heated air to obtain a conditioned air of a desired temperature and supplying said conditioned air to the passenger compartment;

(i) at least one heat pipe structured and dimensioned for interconnection between said generator and said exhaust conduit, said heat pipe having an evaporator section and a condenser section;

(j) said evaporator section being structured and dimensioned for insertion into an internal receiving portion of said exhaust conduit to contact and extract heat from said waste gases flowing through said receiving portion;

(k) a transfer medium for transferring heat from said evaporator section to said condenser section; and (l) said condenser section being structured and dimensioned for insertion into said generator to contact and distribute heat to the absorbent-refrigerant mixture.

2. A system according to claim 1, wherein the mixture of at least two intermiscible components possesses qualities which allow the system to operate with a coefficient of performance ranging from 0.8 to 1.0.

3. A system according to claim 2, wherein the mixture of at least two intermiscible components are chosen from the group consisting of: NaSCN with $NH_3$, $NH_3$ with $LiNO_3$, and methanol with both $ZnCl_2$ and LiBr.

4. A system according to claim 2, wherein said receiving portion is located in a main branch of the exhaust conduit.

5. A system according to claim 2, wherein said exhaust conduit is provided with a bypass and said receiving portion is located in the bypass.

6. A system according to claim 2, wherein at least one of said heat pipes has extending fins protruding around an outside surface of the heat pipe and extending along the evaporator section inserted into the receiving portion of the exhaust conduit.

7. A system according to claim 2, wherein the means for subjecting air to the cooling effect provided in the evaporator has a fan for supplying air to said evaporator and a valve for controlling a flow of air subject to said evaporator.

8. A system according to claim 2, wherein said means for subjecting air to said absorber and said condenser has a fan for supplying air to the absorber and the condenser, and valves for controlling both a flow of heated air released to the atmosphere and a flow of heated air supplied for mixing with the cooled air from said evaporator before entering said passenger compartment.

9. A system according to claim 2, including a heat exchanger installed between said generator and said absorber in which heat from the absorbent exiting the generator is transferred to the absorbent-refrigerant mixture exiting the absorber.

10. A motorized vehicle for carrying passengers which incorporates an air conditioning system, said air conditioning system being structured and dimensioned for incorporation into said motorized vehicle and comprising:

(a) a generator heated by heat of waste gases passing through a main branch of an exhaust conduit, said generator contains a mixture consisting essentially of a volatile component selected from the group consisting of methyl alcohol, ethyl alcohol, ammonia, acetone, ethyl acetate, methyl acetate, methyl acetate-water azeotrope, tetrahydrofuran and mixtures thereof and a salt component selected from the group consisting of NaSCN, $ZnCl_2$, LiBr, $LiNO_3$ and mixtures thereof said volatile component producing vapor when heated in said generator, said vapor serving as a refrigerant and a concentrated solution of said salt component in said volatile component serving as an absorbent for said vapor;

(b) a means for transporting said refrigerant vapor from said generator to a condenser, wherein said refrigerant vapor condenses to provide a heating effect;

(c) a means for transporting said condensed refrigerant from said condenser via a pressure reducing means to an evaporator, wherein said refrigerant expands to a vapor to provide a cooling effect;

(d) a means for transporting said refrigerant vapor from said evaporator to an absorber, and a means for transporting said absorbent from said generator to said absorber, wherein said absorbent absorbs said refrigerant vapor to produce an absorbent-refrigerant mixture and provide a heating effect;

(e) a means for transporting said absorbent-refrigerant mixture from said absorber back to said generator;

(f) a means for subjecting air to the heating effect provided by said absorber and said condenser to cool said absorber and said condenser and to obtain heated air;

(g) a means for subjecting air to the cooling effect provided by said evaporator to obtain cooled air;

(h) a means for mixing proportions of said cooled air and said heated air to obtain a conditioned air of a desired temperature and supplying said conditioned air to the passenger compartment;

(i) at least one heat pipe structured and dimensioned for interconnection between said generator and said exhaust conduit, said heat pipe having an evaporator section and a condenser section;

(j) said evaporator section being structured and dimensioned for insertion into an internal receiving portion of said exhaust conduit to contact and extract heat from said waste gases flowing through said receiving portion;

(k) a transfer medium for transferring heat from said evaporator section to said condenser section; and (l) said condenser section being structured and dimensioned for insertion into said generator to contact and distribute heat to the absorbent-refrigerant mixture.

11. A motorized vehicle according to claim 10, wherein the mixture of said volatile and said salt in the system are chosen from the group consisting of: NaSCN with $NH_3$, $NH_3$ with $LiNO_3$, and methanol with both $ZnCl_2$ and LiBr.

12. A system according to claim 10, wherein the mixture of at least two intermiscible components possesses qualities which allow the system to operate with a coefficient of performance ranging from 0.8 to 1.0.

* * * * *